(12) United States Patent
Nguyen et al.

(10) Patent No.: US 11,974,633 B2
(45) Date of Patent: May 7, 2024

(54) MULTI-LAYER TEXTILE

(71) Applicant: Converse Inc., Boston, MA (US)

(72) Inventors: Le Nguyen, Ho Chi Minh (VN); Viet Tran, Ho Chi Minh (VN); Jen Chung Wu, Douliou (TW)

(73) Assignee: Converse Inc., Boston, MA (US)

( * ) Notice: Subject to any disclaimer, the term of this patent is extended or adjusted under 35 U.S.C. 154(b) by 664 days.

(21) Appl. No.: 17/065,370

(22) Filed: Oct. 7, 2020

(65) Prior Publication Data

US 2021/0100315 A1 Apr. 8, 2021

(30) Foreign Application Priority Data

Oct. 8, 2019 (VN) .............. 1-2019-05530

(51) Int. Cl.
*A43B 23/02* (2006.01)
*A43B 3/00* (2022.01)

(52) U.S. Cl.
CPC ........ *A43B 23/0255* (2013.01); *A43B 3/0036* (2013.01); *A43B 23/0235* (2013.01)

(58) Field of Classification Search
CPC ............ B32B 2250/02; B32B 2250/20; B32B 2255/02; B32B 2255/26; B32B 2255/28; B32B 2307/304; B32B 2307/724; B32B 2307/7265; B32B 2437/00; B32B 2437/02; B32B 2439/06; B32B 2439/46; B32B 3/16; B32B 5/022; B32B 5/024; B32B 5/026; B32B 5/26; B32B 7/12; B32B 7/14; B32B 9/025; B32B 9/047; B32B 3/14; B32B 3/18; B32B 5/02; B32B 9/02; B32B 9/04; A43B 23/0235; A43B 23/0255; A43B 3/0036; A43B 23/02; A43B 3/00; B29C 33/202; B29C 33/22; B29C 33/34; B29C 44/02; B29C 44/3461; B29C 44/35; B29C 44/58; B29K 2025/06; C07C 15/27; C07C 2/68;
(Continued)

(56) References Cited

U.S. PATENT DOCUMENTS 2,001,962 A 5/1935 Kantrow
3,193,948 A 7/1965 Appleby
(Continued)

FOREIGN PATENT DOCUMENTS

DE 344993 12/1921
IN 107164581 A 9/2017
(Continued)

OTHER PUBLICATIONS

International Preliminary Report on Patentability received for PCT Patent Application No. PCT/US2020/054504, dated Apr. 21, 2022, 9 pages.
(Continued)

*Primary Examiner* — Lynda Salvatore
(74) *Attorney, Agent, or Firm* — Shook, Hardy & Bacon L.L.P.

(57) ABSTRACT

A multi-layer textile includes fabric tiles bonded to a base textile layer. The fabric tiles might be cut from one or more larger fabric pieces, which are textile remnants or scraps from prior manufacturing processes. The fabric tiles are bonded to the base textile layer in a manner that reduces the susceptibility of the fabric tiles to peel away from the base textile layer.

16 Claims, 7 Drawing Sheets

(58) Field of Classification Search
CPC .. C07D 311/94; C07D 333/08; C07D 405/04; C07D 409/04
See application file for complete search history.

(56) References Cited

U.S. PATENT DOCUMENTS

| | | | |
|---|---|---|---|
| D448,548 S | 10/2001 | Simpson | |
| RE43,441 E | 6/2012 | Taylor | |
| 9,237,779 B2 | 1/2016 | Berend et al. | |
| 9,320,321 B2 | 4/2016 | Robinson, Jr. | |
| D793,679 S | 8/2017 | Maier | |
| D824,156 S | 7/2018 | Weddle | |
| 2009/0320174 A1* | 12/2009 | Turner | A41D 13/0506 2/69 |
| 2013/0152423 A1 | 6/2013 | Wu | |
| 2017/0356111 A1 | 12/2017 | Bonatz | |
| 2018/0135213 A1 | 5/2018 | Bell et al. | |
| 2018/0263339 A1 | 9/2018 | Neumann et al. | |
| 2018/0371558 A1 | 12/2018 | Kim et al. | |

FOREIGN PATENT DOCUMENTS

| | | |
|---|---|---|
| JP | 2000-289142 A | 10/2000 |
| KR | 10-1248276 B1 | 3/2013 |
| KR | 10-1875475 B1 | 7/2018 |
| RU | 2295270 C2 | 3/2007 |
| TW | 201429718 A | 8/2014 |
| WO | 93/03918 A1 | 3/1993 |
| WO | 2012/166624 A1 | 12/2012 |
| WO | 2018/080404 A1 | 5/2018 |
| WO | 2018/234507 A1 | 12/2018 |

OTHER PUBLICATIONS

Engels et al., "Polyurethanes: Versatile Materials and Sustainable Problem Solvers for Today's Challenges", Angewandte Chemie International Edition vol. 52, issue 36, 2013, pp. 9422-9441.
Grove, Jimmy Choo, Available online at :<us.jimmychoo.com>, Feb. 11, 2019., Feb. 11, 2019, pp. 1-8.
Thame/c, Jimmy Choo, Available online at :<us.jimmychoo.com>, Last accessed: Feb. 2019., 8 pages.
United Nude Women's 'Mosaic Peeptoe' Leather Dress Shoes (Size 7.5 ), Overstock, Available online at :<overstock.com>, Item# 16575149,, Mar. 12, 2015, 3 pages.
International Search Report and Written Opinion received for PCT Patent Application No. PCT/US2020/054504, dated Feb. 10, 2021, 14 pages.

* cited by examiner

MULTI-LAYER TEXTILE

TECHNICAL FIELD

This disclosure relates to a textile having multiple layers, including a layer of fabric tiles.

BACKGROUND

In various manufacturing contexts, textiles or fabric might be initially provided in some bulk form, such as on rolls or in blanks (e.g., standard rectangular sizes). Parts are cut from the bulk form into smaller pieces, thereby leaving remnants. Often, these textile or fabric remnants are not used in subsequent manufacturing and are simply discarded as waste.

BRIEF DESCRIPTION OF THE DRAWINGS

The subject matter of this disclosure is described in detail herein with reference to various figures, which are briefly described below and are submitted together with this written description. These figures are incorporated herein by reference.

DETAILED DESCRIPTION

Subject matter is described throughout this disclosure in detail and with specificity in order to meet statutory requirements. But the aspects described throughout this disclosure are intended to be illustrative rather than restrictive, and the description itself is not intended necessarily to limit the scope of the claims. Rather, the claimed subject matter might be practiced in other ways to include different elements or combinations of elements that are similar or equivalent to the ones described in this disclosure and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

At a high level, this disclosure describes a multi-layer textile in which fabric tiles are bonded to a base textile layer. In one aspect the fabric tiles are cut from one or more larger fabric pieces, which are textile remnants or scraps from prior manufacturing processes. For example, large fabric blanks or rolls might be used to construct footwear articles, upper body or lower body garments, bags, or the like, and the manufacturing of these articles might create fabric remnants. Absent subject matter described in this disclosure, the fabric remnants might be discarded as waste. However, in accordance with an aspect of this disclosure, fabric tiles are cut from the waste fabric pieces and are used to construct a multi-layer textile. In another aspect, the fabric tiles are bonded to the base textile layer in a manner that reduces the susceptibility of the fabric tiles to peel away from the base textile layer.

Figure 1A:
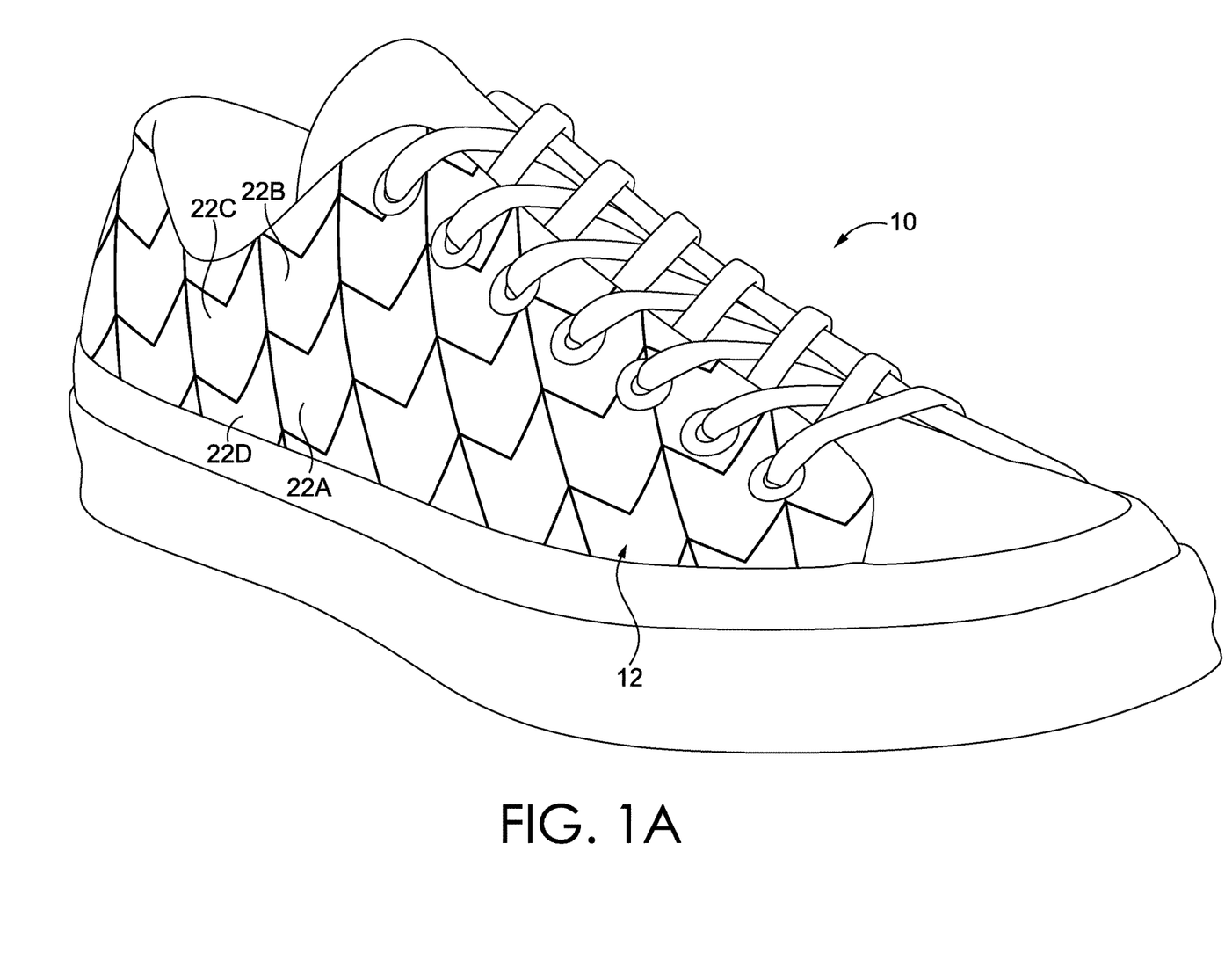
FIGS. 1A and 1B depict a footwear article having a multi-layer textile in accordance with an aspect of this disclosure.
Figure 1B:
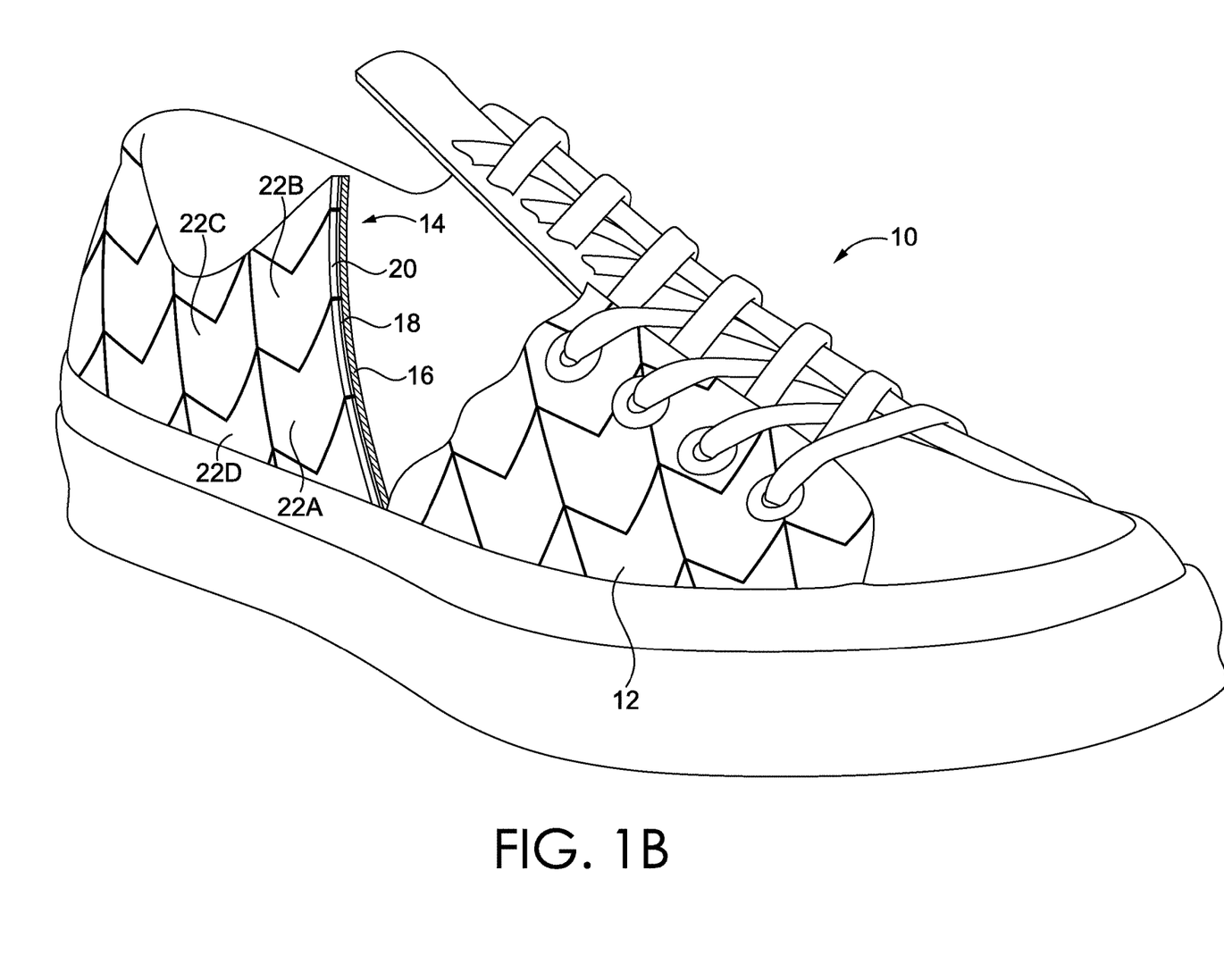

Referring to FIGS. 1A and 1B, an exemplary footwear article 10 is depicted having an upper 12 constructed at least partially from a multi-layer textile 14 (identified in FIG. 1B). To aid in the description of, and parts identification of, the multi-layer textile 14, a portion of the upper has been cut away in FIG. 1B to reveal layers of the multi-layer textile 14. For example, FIG. 1B depicts a base textile layer 16, a bonding layer 18, and a tiled fabric layer 20. The tiled fabric layer 20 includes a plurality of fabric tiles 22A, 22B, 22C, and 22D that are bonded to the base textile layer 16. The footwear article 10 is just one example of the type of item that might be constructed using the multi-layer textile, and in other aspects, the multi-layer textile might be used to construct bags and other garments and apparel, such as pants, shirts, outerwear, gloves, hats, and the like.

Figure 2A:
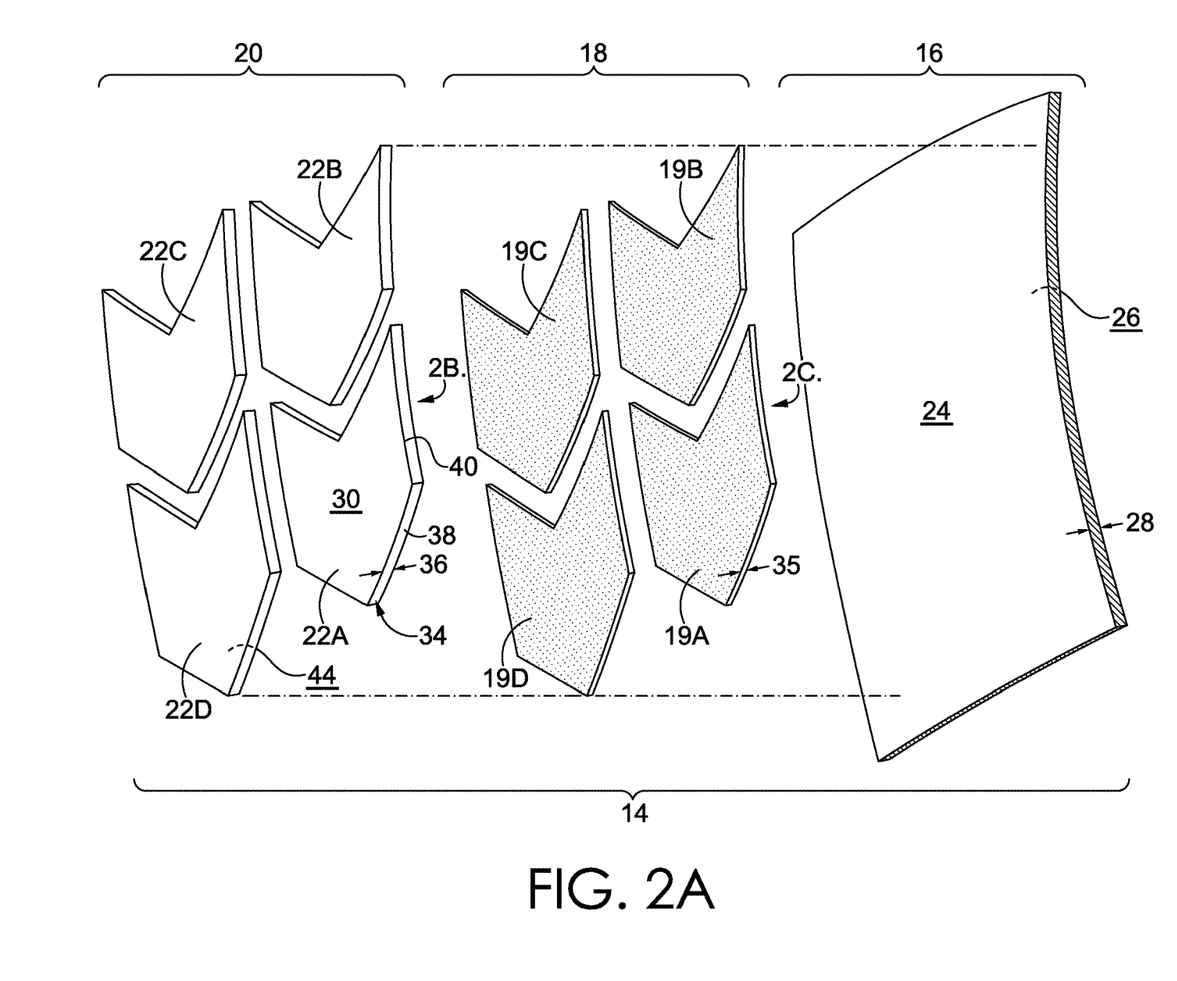
FIG. 2A depicts an exploded view of a portion of a multi-layer textile in accordance with an aspect of this disclosure.

Referring now to FIG. 2A, the multi-layer textile 14 is schematically depicted in an exploded view, in which the base textile layer 16 is depicted decoupled from the bonding layer 18 and the tiled fabric layer 20. FIG. 2A also includes reference arrows 2B and 2C that identify a reference point of view for FIGS. 2B and 2C for viewing surfaces of a fabric tile 22A and a bonding portion 19A, respectively.

In general, the base textile layer 16 includes a first surface 24, a second surface 26, and a thickness 28 between the first and second surfaces 24 and 26. The base textile layer 16 might include a variety of different substrates, including one or more fabrics, textiles, cloths, and the like. For example, the base textile layer 16 might include a canvas or other woven textile, a non-woven textile, a knit textile, a braided textile, leather, and the like. Furthermore, the base textile layer 16 might include various material properties collectively or alternatively, such as air and moisture permeability, thermal insulation, moisture wicking, moisture repellant, and the like. The material properties might operate in various capacities to render the base textile layer 16 suitable to function in various contexts. For example, in one aspect the material properties of the base textile layer 16 operate collectively to render the base textile layer 16 suitable as an interior liner of the upper of a footwear article. Although FIG. 2A depicts the base textile layer 16 as a single layer, in other aspects the base textile layer may include a plurality of layers combined in a laminate or other multi-layer, base textile layer.

The bonding layer 18 is coupled directly with the first surface 24 of the base textile layer 16, and the tiled fabric layer 20 includes the plurality of discrete fabric tiles 22A-22D affixed to the first surface 24 of the base textile layer 16 by way of the bonding layer 18. The bonding layer 18 might include various bonding agents, including hot-melt bonding agents (e.g., TPU), pressure-sensitive bonding agents, water-based bonding agents, chemically cured agents, UV cured agents, and the like. Furthermore, additional agents might be combined in the bonding layer 18 in order to improve a strength of the bond between the fabric tiles 22A-22D and the base textile layer 16. For example, a primer might be combined with any of the above-listed bonding agents, and in one aspect of the disclosure, the bonding layer 18 includes a primer comprising 100 parts polyurethane resin and 5 parts hardener (e.g., Guarandure E-766R from ZhongBu Adhesive & Chemical Co.).

The composition of the bonding layer 18 might vary depending on the type of fabric tiles making up the tiled fabric layer 20. For example, a bonding layer affixing heavier-weight tiles, such as leather, to the base textile layer 16 might include the bonding agent (e.g., 0.2 mm hot-melt film) and the primer, whereas a bonding layer affixing lighter-weight tiles, such as woven canvas, to the base textile layer 16 might only include the bonding agent (e.g., 0.2 mm hot-melt film).

The bonding layer 18 might comprise various forms. For example, as depicted in FIG. 2A, the bonding layer 18 (or portions of the bonding layer 18) might have a relatively uniform thickness 35 across each of the discrete bonding-layer portions 19A-19D and across the entirety of the bonding layer 18. This relatively uniform thickness might arise from a pre-activated form of the bonding layer 18, and in one aspect, the bonding layer 18 includes a hot-melt film that, when activated, provides a relatively uniform bonding layer 18. The hot-melt film might include various thicknesses, and in one aspect, the hot-melt film includes a pre-activated thickness in a range of about 0.1 mm to about 0.5 mm. The hot-melt film might take various forms, such as a solid sheet or a mesh. In other aspects, the bonding layer 18 might include a brush-on form or spray-on form that could also be applied in a relatively uniform manner to yield a relatively uniform thickness. The bonding layer 18 also includes a plurality of discrete bonding-layer portions 19A-19D, and these will be described in more detail in other portions of this disclosure.

Continuing with FIG. 2A, the tiled fabric layer 20 includes the plurality of discrete fabric tiles 22A-22D. As previously mentioned, in one aspect of this disclosure the discrete fabric textiles 22A-22D are cut from larger pieces of textile or fabric that would otherwise be discarded as scrap or waste after having been previously used to manufacture a different article. The larger pieces of fabric, and hence the discrete fabric tiles 22A-22D, might include various fabrics, textiles, cloths, and the like. For example, the fabric tiles 22A-22D might include canvas or other woven textiles, a non-woven textile, a knit textile, a braided textile, leather, and the like. The fabric tiles 22A-22D might all comprise the same textile type or might include various different textile types. In one aspect, all of the fabric tiles are leather. In another aspect, all of the fabric tiles are canvas.

As used in this disclosure, the term "fabric tile" describes a piece of fabric having a first planar surface, a second planar surface, and a body having a thickness between the planar surfaces. Furthermore, a tile perimeter edge extends continuously and entirely around the body to outline, and form a perimeter boundary of, the fabric tile. The tile perimeter edge also forms perimeter edges around the first and second planar surfaces. Although the tile perimeter edge could include a continuous surface entirely around the fabric tile, the tile perimeter edge could also comprises threads or fibers that collectively from the rest of the fabric tile and that each terminates at a continuous and consistent position around the periphery of the fabric tile to form the tile perimeter edge. As such, a leather fabric tile, a knit fabric tile, and a woven fabric tile each includes a tile perimeter edge that continuously extends around the entire body of the fabric tile. The perimeter edge of each planar surface generally defines a two-dimensional planar shape, and the two-dimensional planar shapes of the planar surfaces are generally congruent (i.e., substantially same shape and substantially same size). The thicknesses fabric tiles (e.g., the thickness 36 of the fabric tile 22A) may vary, and in some aspects the thickness of a fabric tile is in a range of about 1 mm to about 2.5 mm. However, the thickness may be larger or smaller in some aspects. Furthermore, the surface area of each planar surface may also vary, and in some aspects, the surface area may be in a range between approximately 0.75 cm$^2$ and 5.0 cm$^2$. In one or more of these respects, a fabric tile is distinguishable from ground, powdered, or other particulate forms of recycled textiles.

Figures 2B, 2C:
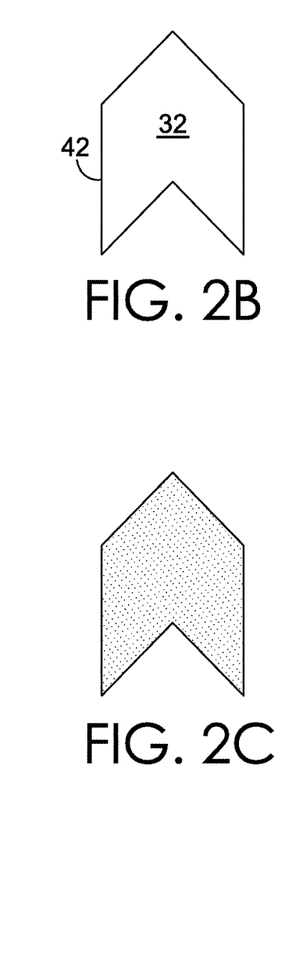
FIG. 2B depicts a surface of a fabric tile in accordance with an aspect of this disclosure.
FIG. 2C depicts a surface of a discrete bonding-layer portion in accordance with an aspect of this disclosure.

To help illustrate these elements of a fabric tile, in FIGS. 2A and 2B the fabric tile 22A has been labeled with reference numerals to include a first planar surface 30 (i.e., outward facing surface) and a second planar surface 32 (shown in FIG. 2B), and a body 34 having a thickness 36 between the first and second planar surfaces 30 and 32. The fabric tile 22A also includes a tile perimeter edge 38 that extends continuously and entirely around the body 34, and the tile perimeter edge 38 also forms the perimeter edges 40 and 42 of the planar surfaces. As previously described, the tile perimeter edge 38 could be formed of fibers, threads, or other material forms depending on the material-type of the fabric, and in some aspects, the fabric is a woven canvas or a leather. As shown in FIG. 2B, the planar-surface perimeter edge 42 forms a two-dimensional planar shape including a chevron. The chevron is merely one example, and in other aspects, the two-dimensional shape might include a triangle, square, rectangle, or any other polygon or other plane figure having a complete external boundary comprised of a continuous perimeter edge.

Continuing with FIGS. 2A and 2B, the surface 32 of the discrete fabric tile 22A is a bonded surface that faces towards the bonding layer 18 and the first surface 24 of the base textile layer 16, and as previously mentioned, the surface 32 includes a two-dimensional shape. Furthermore, the bonding layer 18 includes discrete bonding-layer portions 19A-19D. The discrete bonding-layer portion 19A is layered between the discrete fabric tile 22A, and the base textile layer 16 and also includes a two-dimensional shape, which is a same shape as the two-dimensional shape of the discrete fabric tile 22A. That is, FIG. 2C depicts a plan view of the discrete bonding-layer portion 19A and illustrates a two-dimensional chevron shape substantially congruent to the two-dimensional chevron shape of the discrete fabric tile 22A. As will be described in more detail in other portions of this disclosure, the area of the two-dimensional shape of the discrete bonding-layer portion (e.g., the area of the chevron in FIG. 2C) may change in different stages of the manufacturing process. For example, when the discrete bonding-layer portion is initially cut, the area of the two-dimensional shape may include a first dimensional quantity, and after activation (e.g., after application of heat and pressure), the area may slightly increase if the discrete bonding-layer portion flattens out.

The plurality of fabric tiles 22A-22D make up the tiled fabric layer 20, and as such, the tiled fabric layer 20 includes a second discrete fabric tile 22D, which also includes a bonded surface 44 facing towards the bonding layer 18. The bonded surface 44 includes a two-dimensional shape, which is also a chevron similar to FIG. 2B; however, in other aspects of this disclosure, the two-dimensional shapes might vary among the fabric tiles forming the tiled fabric layer. Continuing with FIG. 2A the bonding layer 18 includes another discrete bonding-layer portion 19D layered between the discrete fabric tile 22D and the base textile layer 16 and having a two-dimensional shape. The two-dimensional shape of the discrete bonding-layer portion 19D is the same shape as the two-dimensional shape of the discrete fabric tile 22D.

The discrete bonding-layer portions 19A-19D technically operate in various manners to bond the plurality of fabric tiles 22A-22D to the base textile layer 16. For example, when attached to the bonded surfaces (e.g., 32 and 44) of the fabric tiles prior to coupling with the base textile layer 16, the discrete bonding-layer portions 19A-19D may in some instances add rigidity to the fabric tiles, thereby making the fabric tiles easier to manipulate on the base textile layer 16 prior to bond activation (e.g., heat and pressure application). The additional rigidity might also reduce the likelihood that perimeter edges of adjacent fabric tiles will pucker away from the base textile layer when the adjacent fabric tiles are slid into an abutting relationship prior to bond activation, since this pucker could reduce the bond strength between the perimeter edge and the base textile layer. Furthermore, the discrete bonding-layer portions 19A-19D allow for customized spacing between adjacent fabric tiles, while still allowing for the surface 24 of the base textile layer 16 to remain exposed. Some of these aspects will be described in more detail below with respect to FIGS. 3A-3C, 4A, and 4B.

Absent an aspect of the present disclosure, leather fabric tiles might be susceptible to peeling away from the base textile layer 16. However, as indicated in other portions of this disclosure, in at least one aspect of this disclosure, the bonding layer 18 comprises elements that have been shown to include a peel strength that meets or exceeds a threshold. For example, in one aspect, the fabric tiles include leather fabric tiles, and the bonding layer 18 includes a hot-melt film combined with a primer. For example, the hot-melt film might include a thickness in a range of about 0.1 mm to about 0.5 mm and might include various compositions, such as TPU. The primer might include various compositions, and in one aspect, the primer includes 100 parts polyurethane resin and 5 parts hardener (e.g., Guarandure E-766R from ZhongBu Adhesive & Chemical Co.). Testing has shown that when a bonding layer 18 having a 0.2 mm TPU hot-melt film with the primer is used to affix the leather fabric tiles to the base textile layer, the bonding layer 18 includes a peel strength that meets or exceeds 24.525N/cm. In a further aspect, the peel strength is tested pursuant to SATRA TM401 (formerly AM1), dated July 2000.

Figures 3A, 3B, 3C:
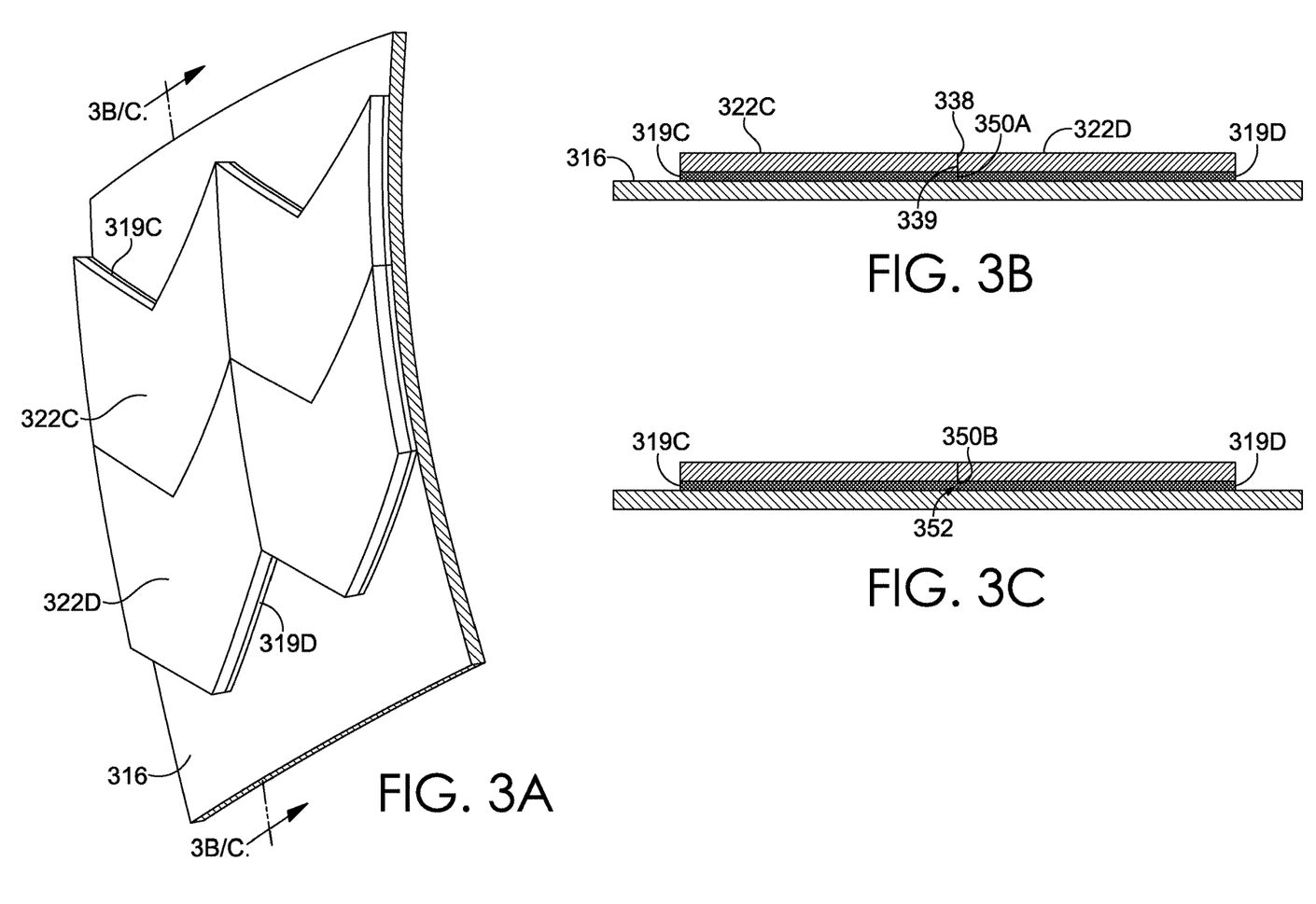
FIG. 3A depicts a multi-layer textile in accordance with an aspect of this disclosure.
FIG. 3B depicts a cross-sectional view taken at reference line 3B/C-3B/C in FIG. 3A in accordance with an aspect of this disclosure.
FIG. 3C depicts a cross-sectional view taken at reference line 3B/C-3B/C in FIG. 3A in accordance with an aspect of this disclosure that is alternative to FIG. 3B.

When constructed into a multi-layer textile, the plurality of fabric tiles 22A-22D might include various positions and spacing of one fabric tile relative to an adjacent fabric tile. For example, in FIGS. 1A, 1B, and 3A-3C, the fabric tiles have relatively minimal spacing therebetween. In other words, when the fabric tiles are coupled to the base textile layer by way of the bonding layer, the perimeter edges of adjacent fabric tiles abut, or nearly abut, one another. In one aspect, in this type of abutting arrangement, the perimeter edges of the fabric tiles are spaced apart by less than 1 mm. Referring to FIGS. 3A-3C, the fabric tiles 322C and 322D are coupled to the base textile layer 316 by way of the discrete bonding-layer portions 319C and 319D, respectively. The fabric tile 322C includes a perimeter edge 338 and corresponding discrete bonding-layer portion 319C, and the fabric tile 322D includes a perimeter edge 339 and corresponding discrete bonding-layer portion 319D. The perimeter edges 338 and 339 abut one another, and as previously explained, the discrete bonding-layer portions 319C and 319D might contribute some rigidity to the fabric tiles to impede puckering prior to bond activation.

The depiction in FIG. 3B includes a distinct boundary division 350A between the discrete bonding-layer portions 319C and 319D, and this indicates that in some aspects after bond activation (e.g., heat and pressure application) the discrete bonding-layer portions 319C and 319D may abut and not meld together. In an alternative aspect depicted by FIG. 3C, a partial boundary division 350B is depicted with a small bridge 352 of bonding agent connecting the discrete bonding-layer portion 319C and 319D, and this indicates that the discrete bonding-layer portions 319C and 319D may abut and at least partially meld together when the bonding agent is activated. But in the aspect depicted by FIG. 3C, the construction still includes discrete bonding-layer portions, which would be identifiable by the partial boundary division 350B.

In FIG. 3A-3C, discrete bonding-layer portions 319C and 319D having an abutting relationship provide various advantages. For example, the interface between the bonding-layer portions 319C and 319D may operate as a flex line along which the textile might more easily bend or fold (as compared to a solid bonding-layer with no discrete portions), thereby contributing to the overall flexibility of the textile. In addition, the usage of discrete bonding-layer portions 319C and 319D may contribute to the breathability of the textile, since fluid (e.g., air, vapor, etc.) may more easily pass through the textile at the interface between the discrete bonding-layer portions.

Figure 4A:
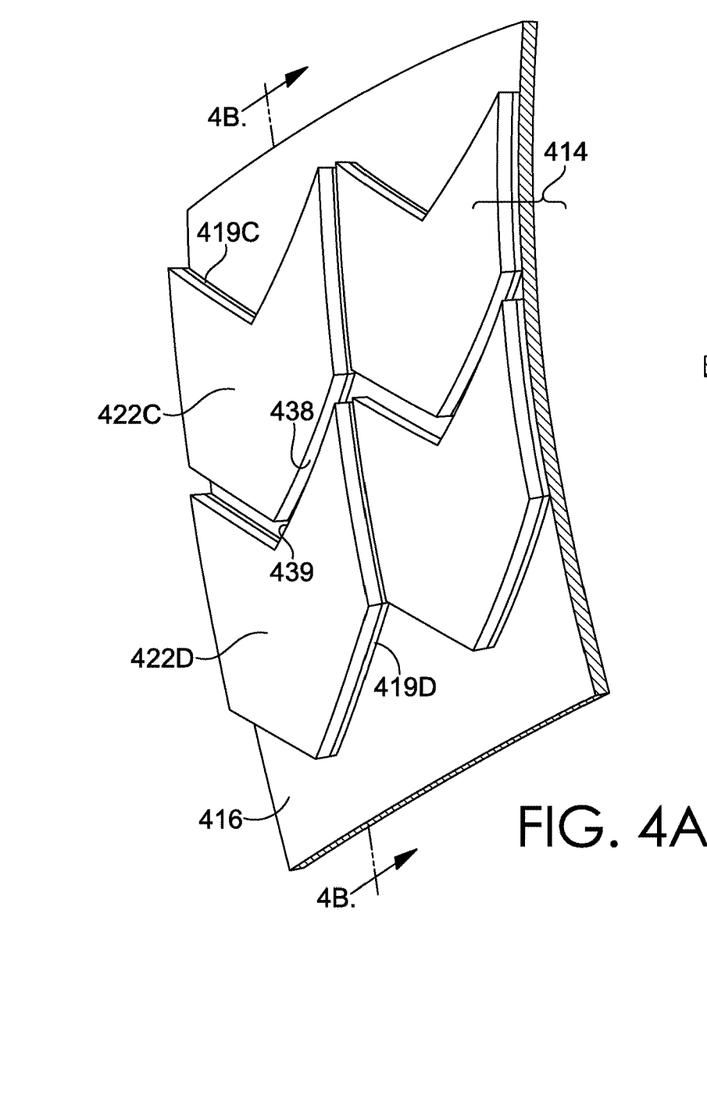
FIG. 4A depicts a multi-layer textile in accordance with an aspect of this disclosure.
Figure 4B:
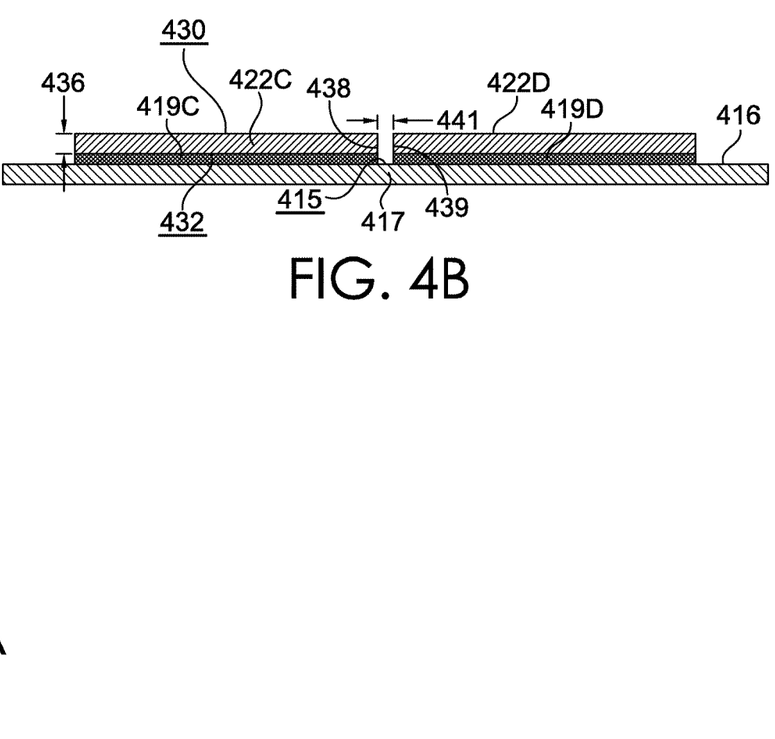
FIG. 4B depicts a cross-sectional view taken at reference line 4B-4B in FIG. 4A in accordance with an aspect of this disclosure.

Referring now to FIGS. 4A and 4B, in other aspects of this disclosure, when the fabric tiles are coupled to the base textile layer by way of the bonding layer, the perimeter edges of adjacent fabric tiles are spaced apart by a distance without any portion of the tiled fabric layer being positioned therebetween. The distance between perimeter edges may vary, and in one aspect, in a spaced-apart arrangement, the distance is in a range of about 1 mm to about 5 mm. In this type of construction, the fabric tiles are still connected to one another by a portion of the base textile layer spanning the distance.

For example, the multi-layer textile 414 includes the fabric tiles 422C and 422D, which are coupled to the base textile layer 416 by way of the discrete bonding-layer portions 419C and 419D, respectively. The fabric tile 422C includes a perimeter edge 438 and corresponding discrete bonding-layer portion 419C, and the fabric tile 422D includes a perimeter edge 439 and corresponding discrete bonding-layer portion 419D. The perimeter edges 438 and 439 are facing towards one another (e.g., FIG. 4B) and are spaced apart from one another, and in one aspect of the disclosure, the perimeter edges 438 and 439 are spaced apart from one another by a distance 441 (FIG. 4B) in a range of about 1 mm to about 5 mm in a spaced-apart arrangement. Furthermore, the fabric tiles 422C and 422D are connected to one another by a portion 417 of the base textile layer 416, and the portion 417 includes an exposed surface 415 not covered by the bonding layer or the tiled fabric layer.

The spaced-apart arrangement might include various features that contribute to technical operation of the multi-layer textile 414. For example, in one aspect a fabric-tile thickness 436 between the outward-facing surface 430 and the bonded surface 432 is in a range of about 1 mm to about 2.5 mm, and the distance is in a range of about 1 mm to about 5 mm. In a further aspect, a ratio of the distance 441 to thickness 436 is in a range of about 5:1 to 1:1. In addition, the spaced-apart arrangement may increase the flexibility of the multi-layer textile, which is more bendable along the portions 417 between the fabric tiles. Furthermore, the spaced-apart arrangement may increase the breathability of the textile, which might be more breathable along the portions 417 having fewer stacked layers. Further still, because the bonding layer includes discrete bonding-layer portions, the exposed portion 417 may not be coated with any bonding agent that might change color with aging (e.g., yellowing). As such, the discrete-bonding layer construction may preserve the appearance of the textile. Moreover, by spacing the fabric tiles apart in a non-abutting relationship, adjacent tiles may be less likely to interfere with one another when the bonding layer is activated, and as such, may be less susceptible to peeling away from the base textile layer 416.

Figure 5:
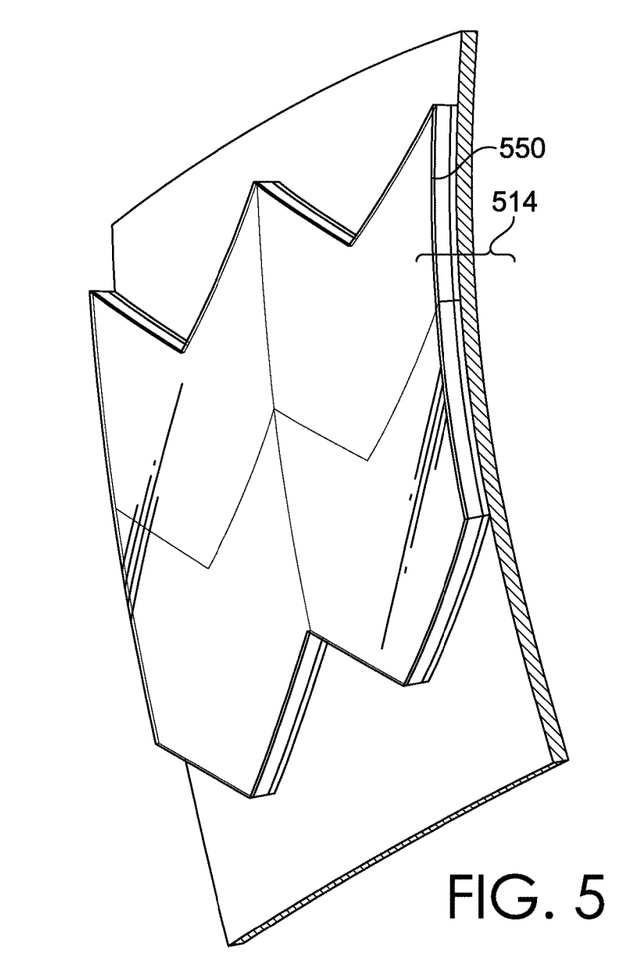
FIG. 5 depicts a multi-layer textile with an overlay in accordance with an aspect of this disclosure.

Referring now to FIG. 5, in another aspect of the disclosure, a multi-layer textile includes an overlay coupled to the outward-facing surface of the fabric tiles. For example, in FIG. 5 the multi-layer textile 514 includes an overlay 550 coupled to the outward-facing surface of the fabric tiles. The overlay 550 might include various features. For example, the overlay 550 might be transparent, as illustrated by the oblique line shading. Or, in alternative aspects, the overlay 550 might include a tint, color, or design. In another aspect, the overlay includes a hot-melt film that is constructed into the multi-layer textile 514 at simultaneously with the bonding of the fabric tiles to the base textile layer. Among other things, the overlay 550 might reduce the likelihood that fabric tiles will peel away from the base textile layer. The hot-melt film 550 might be a solid sheet, as depicted in FIG. 5, or alternatively, the hot-melt film might have vent apertures positioned at various locations across the film to improve breathability. One example of a hot-melt film with apertures is a mesh film with regularly positions apertures arranged in a grid. Although FIG. 5 depicts a multi-layer textile 514 with fabric tiles in an abutting relationship (similar to FIG. 3), a multi-layer textile having fabric tiles in a spaced-apart arrangement (similar to FIG. 4) might also include an overlay.

Figure 6:
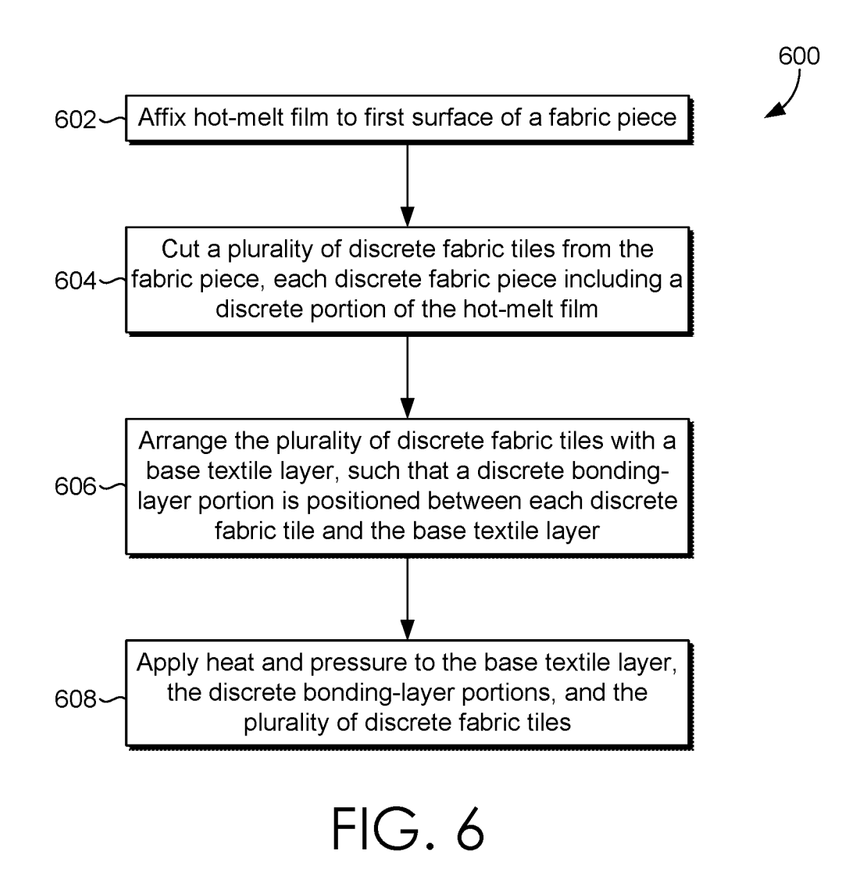
FIG. 6 depicts a flow chart showing a method of manufacturing a multi-layer textile in accordance with an aspect of this disclosure.

Referring now to FIG. 6, a flow diagram illustrates a series of steps that might be carried out when executing a method 600 of manufacturing a multi-layer textile having discrete fabric tiles. Step 602 includes affixing a hot-melt film to a first surface (i.e., bonded surface) of a fabric piece. For example, a hot-melt film (e.g. solid sheet or mesh) could be affixed to a first surface of a fabric remnant that is left over from a prior manufacturing process. The hot-melt film could be affixed to the first surface by overlaying the hot-melt film onto the first surface and heating the combined hot-melt film and fabric remnant in a heat press for about 3 to 5 seconds at approximately 130 degrees C. In one aspect of the disclosure, this heating step provides a partial activation of the hot-melt film that causes the hot-melt film to affix to the fabric piece, such that the hot-melt film and fabric piece can be further processed in later subsequent steps of the method. In another aspect of the disclosure, the affixing of the hot-melt film to the fabric piece includes applying a primer mix (e.g., 100 parts polyurethane resin with 5 parts hardener) to the bonded surface prior to applying the hot-melt film and heating the primer and fabric piece for 25 to 35 seconds at approximately 70 degrees C.

After the hot-melt film has been affixed to the first surface, step 604 includes cutting a plurality of discrete fabric tiles from the fabric piece. Each discrete fabric tile included among the plurality of discrete fabric tiles now includes a portion of the first surface and a discrete portion of the hot-melt film affixed to the portion of the first surface. The fabric tiles might be cut from the fabric piece using a variety of different techniques. For example, the fabric tiles might be cut using oscillating knife cutting, a die, laser cutting, and the like.

At step 606, the plurality of discrete fabric tiles are arranged with a base textile layer with the portion of the first surface facing towards the base textile layer and the discrete portion of the hot-melt film arranged between the discrete fabric tile and the base textile layer. The plurality of discrete fabric tiles might be arranged using various techniques. For example, in one aspect a jig having a guide pattern is laid on top of the base textile layer. The jig might be constructed of a variety of different materials, and in one aspect, the jig includes silicone. In addition, the jig might have various dimensions, patterns, guide sizes, etc. For example, in one aspect, the tile-spacing dividers that space apart adjacent fabric tiles have a thickness in a range between 1 mm and 5 mm. Although the jig might be placed directly on top of the base textile layer, in other aspects, the fabric tiles are first arranged in the jig with the discrete bonding-layer portions facing upward, and the base textile layer is then positioned on top of the fabric tiles with the discrete bonding-layer portions therebetween.

The arranging step might include other stages in other aspects of the disclosure. For example, if an abutting relationship is desired, then the jig might be used to lay out an initial pattern of the fabric tiles, and after the initial pattern is set, then jig is removed and the fabric tiles may be manually slid into an abutting relationship. As indicated previously, the bonding layer that is already affixed to the fabric tiles may increase the rigidity of the fabric tiles to make them easier to slide and to reduce the likelihood that the edges of the fabric tiles will pucker when slid into an abutting relationship. When the fabric tiles will be slid together, a jig with narrower guides (e.g., 1 mm width guides) might be selected in order to reduce the distance the fabric tiles need to be slid to abut an adjacent fabric tile. In other aspects, a spaced-apart arrangement might be desired, in which case the fabric tiles might be left in the fabric-tile pattern dictated by the jig. Furthermore, the fabric tiles might be left in the jig during the subsequent heating and pressing step to help hold the fabric tiles in position until fully secured to the base textile layer.

Step 608 includes applying an amount of heat to the base textile layer, the discrete portions of the hot-melt film, and the plurality of discrete fabric tiles. For example, as previously mentioned, the base textile layer might be placed on the fabric tiles with the discrete bonding-layer portions sandwiched therebetween. The combination of layers might be heated and pressed in a range of about 20 to 30 seconds and at a temperature of approximately 130 degrees C. Once the multi-layer textile has cooled, portions of an upper can be cut from the multi-layer textile, such as the vamp, tongue, quarters, and the like.

As described with respect to FIG. 5, in some aspects the multi-layered textile might include an overlay. In those instances, the method 600 might include additional steps. For example, the overlay could be affixed to the fabric piece prior to cutting the discrete fabric tiles. Or the overlay could be positioned over the discrete fabric tiles after they have been set or maneuvered into a final position and the jig has been removed.

Some aspects of this disclosure have been described with respect to the examples provided in the figures. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations. Further, the terminology "any of clauses" or similar variations of said terminology is intended to include "any one of clauses" or other variations of such terminology, as indicated by some of the examples provided above.

The following clauses are aspects contemplated herein.

Clause 1: A multi-layer textile comprising: a base textile layer having a first surface, a second surface, and a thickness between the first surface and the second surface; a bonding layer coupled directly with the first surface of the base textile layer; a tiled fabric layer having a plurality of discrete fabric tiles affixed to the first surface of the base textile layer by way of the bonding layer, wherein the plurality of discrete fabric tiles includes a first discrete fabric tile including a first bonded surface facing towards the bonding layer and the first surface of the base textile layer and having a first two-dimensional shape; and wherein the bonding layer includes a first discrete bonding-layer portion layered between the first discrete fabric tile and the base textile layer and having a second two-dimensional shape that is a same shape as the first two-dimensional shape.

Clause 2. The textile of Clause 1, wherein the tiled fabric layer comprises a second discrete fabric tile having a second bonded surface facing towards the bonding layer and having a third two-dimensional shape; and wherein the bonding layer includes a second discrete bonding-layer portion layered between the second discrete fabric tile and the base textile layer and having a fourth two-dimensional shape, which is a same shape as the third two-dimensional shape.

Clause 3. The textile of Clause 2, wherein the first discrete fabric tile has a first perimeter edge and the second discrete fabric tile has a second perimeter edge, which is adjacent to, facing towards, and spaced apart from, the first perimeter edge by a distance; and wherein the first fabric tile and the second fabric tile are connected to one another by a portion of the base textile layer spanning the distance.

Clause 4. The multi-layer textile of Clause 3, wherein the first discrete fabric tile includes a first exposed surface facing away from the first bonded surface and a thickness between the first bonded surface and the first exposed surface; and wherein a ratio of the distance to the thickness is in a range of about 5:1 to 1:1.

Clause 5. The multi-layer textile of Clauses 3 or 4, wherein the distance is in a range of about 1 mm to about 5 mm.

Clause 6. The multi-layer textile of any of Clauses 1-5, wherein the bonding layer includes a primer and a hot-melt adhesive.

Clause 7. The multi-layer textile of any of Clauses 1-6 further comprising, an overlay bonded directly to the plurality of discrete fabric tiles.

Clause 8. The multi-layer textile of claim 7, wherein the overlay comprises a hot-melt film.

Clause 9. The multi-layer textile of Clause 8, wherein the hot-melt film includes vent perforations.

Clause 10. The multi-layer textile of Clause 9, wherein the hot-melt film includes a mesh.

Clause 11. The multi-layer textile of any of Clauses 1-10, wherein the plurality of discrete fabric tiles comprise leather.

Clause 12. The multi-layer textile of any of Clauses 1-10, wherein the plurality of discrete fabric tiles comprise canvas.

Clause 13. A multi-layer textile comprising: a base textile layer having a first side and a second side; a bonding layer coupled directly with the first side of the base textile layer; a tiled fabric layer having a first fabric tile adjacent to a second fabric tile, wherein the bonding layer is layered directly between the tiled fabric layer and the base textile layer and couples the first and second fabric tiles to the base textile layer; wherein the first fabric tile has a first perimeter edge and the second fabric tile has a second perimeter edge, which is adjacent to, and spaced apart from, the first perimeter edge by a distance without any portion of the tiled fabric layer being positioned between the first and second perimeter edges; and wherein the first fabric tile and the second fabric tile are connected to one another by a portion of the base textile layer spanning the distance.

Clause 14. The multi-layer textile of Clause 13, wherein the first and second fabric tiles each includes a bonded surface facing towards the base textile layer, an exposed surface facing away from the bonded surface, and a thickness between the bonded surface and the exposed surface; wherein the tiled fabric layer includes a fabric-layer thickness comprising an average thickness of the first and second fabric tiles; and wherein a ratio of the distance to the fabric-layer thickness is in a range of about 5:1 to 1:1.

Clause 15. The multi-layer textile of Clauses 13 or 14, wherein the distance is in a range of about 1 mm to about 5 mm.

Clause 16. The multi-layer textile of any of clauses 12-15, wherein the first fabric tile includes a first bonded surface facing towards the bonding layer and having a first two-dimensional shape; wherein the bonding layer includes a first discrete bonding-layer portion layered between the first fabric tile and the base textile layer and having a second two-dimensional shape, which is a same shape as the first two-dimensional shape; wherein the second fabric tile includes a second bonded surface facing towards the bonding layer and having a third two-dimensional shape; and wherein the bonding layer includes a second discrete bonding-layer portion layered between the second fabric tile and the base textile layer and having a fourth two-dimensional shape, which is a same shape as the third two-dimensional shape.

Clause 17. The multi-layer textile of any of Clauses 1-16, wherein the bonding layer includes a solid sheet.

Clause 18. The multi-layer textile of any of Clauses 1-16, wherein the bonding layer includes a mesh.

Clause 19. The multi-layer textile of any of Clauses 1-18, wherein a fabric tile includes one or more straight edges.

Clause 20. The multi-layer textile of any of Clauses 1-19, wherein a fabric tile includes a polygon.

Clause 21. The multi-layer textile of any of Clauses 1-19, wherein a fabric tile includes one or more curved edges.

Clause 22. The multi-layer textile of any of Clauses 1-19, wherein a fabric tile is a circle.

Clause 23. The multi-layer textile of any of Clauses 22, wherein fabric tiles are arranged in a mosaic.

Clause 24. The multi-layer textile of any of Clauses 22, wherein fabric tiles are arranged as a jigsaw puzzle.

Clause 25. A method of manufacturing a multi-layer textile having discrete fabric tiles, the method comprising: affixing a hot-melt film to a first surface of a fabric piece; cutting a plurality of discrete fabric tiles from the fabric piece, wherein each discrete fabric tile included among the plurality of discrete fabric tiles comprises a portion of the first surface and a discrete portion of the hot-melt film affixed to the portion of the first surface; arranging the plurality of discrete fabric tiles with a base textile layer with the portion of the first surface facing towards the base textile layer and the discrete portion of the hot-melt film arranged between the discrete fabric tile and the base textile layer; and applying an amount of heat to the base textile layer, the discrete portions of the hot-melt film, and the plurality of discrete fabric tiles.

Clause 26. The method of Clause 25, wherein arranging the plurality of discrete fabric tiles on a base textile layer comprises placing the plurality of discrete fabric tiles in a jig including tile-spacing dividers that space apart adjacent fabric tiles.

Clause 27. The method of Clause 26 further comprising, sliding the adjacent fabric tiles towards one another to reduce a distance therebetween before the amount of heat is applied.

Clause 28. The method of any of Clauses 25-27 further comprising, disposing a hot-melt film at a second surface of the discrete fabric tiles opposing the first surface, prior to applying the amount of heat.

Clause 29. A footwear upper comprising the textile of any of Clauses 1-24.

Clause 30. A bag comprising the textile of any of Clauses 1-24.

Clause 31. A garment comprising the textile of any of Clauses 1-24.

From the foregoing, it will be seen that this subject matter is well adapted to attain the ends and objects hereinabove set forth together with other advantages, which are obvious and inherent to the structure. It will be understood that certain features and subcombinations are of utility and might be employed without reference to other features and subcombinations. This is contemplated by and is within the scope of the claims. Since many possible variations and alternative might be made of this subject matter without departing from the scope thereof, it is to be understood that all matter herein set forth or shown in the accompanying drawings is to be interpreted as illustrative and not in a limiting sense.

The invention claimed is:

1. A multi-layer textile comprising:
   a base textile layer having a first surface, a second surface, and a thickness between the first surface and the second surface;
   a bonding layer coupled directly with the first surface of the base textile layer;
   a tiled fabric layer having a plurality of discrete fabric tiles affixed to the first surface of the base textile layer by way of the bonding layer,
      wherein the plurality of discrete fabric tiles includes a first discrete fabric tile including a first bonded surface facing towards the bonding layer and the first surface of the base textile layer, wherein each of the plurality of discrete fabric tiles has a first two-dimensional shape; and
      wherein the bonding layer includes a plurality of discrete bonding tiles having the first two-dimensional shape, wherein each of the plurality of discrete bonding tiles is layered between each of the plurality of discrete fabric tiles and the base textile layer, such that a peripheral edge of each of the plurality of discrete bonding tiles abuts the peripheral edge of an adjacent discrete bonding tile.

2. The textile of claim 1, wherein the tiled fabric layer comprises a second discrete fabric tile having a second bonded surface facing towards the bonding layer and having a third two-dimensional shape; and wherein the bonding layer includes a second discrete bonding-layer portion layered between the second discrete fabric tile and the base textile layer and having a fourth two-dimensional shape, which is a same shape as the third two-dimensional shape.

3. The textile of claim 2, wherein the first discrete fabric tile has a first perimeter edge and the second discrete fabric tile has a second perimeter edge, which is adjacent to, facing towards, and spaced apart from, the first perimeter edge by a distance; and wherein the first fabric tile and the second fabric tile are connected to one another by a portion of the base textile layer spanning the distance.

4. The multi-layer textile of claim 3,
   wherein the first discrete fabric tile includes a first exposed surface facing away from the first bonded surface and a thickness between the first bonded surface and the first exposed surface; and
   wherein a ratio of the distance to the thickness is in a range of about 5:1 to 1:1.

5. The multi-layer textile of claim 3, wherein the distance is in a range of about 1 mm to about 5 mm.

6. The multi-layer textile of claim 1, wherein the bonding layer includes a primer and a hot-melt adhesive.

7. The multi-layer textile of claim 1 further comprising, an overlay bonded directly to the plurality of discrete fabric tiles.

8. The multi-layer textile of claim 7, wherein the overlay comprises a hot-melt film.

9. The multi-layer textile of claim 8, wherein the hot-melt film includes vent perforations.

10. The multi-layer textile of claim 9, wherein the hot-melt film includes a mesh.

11. The multi-layer textile of claim 1, wherein the plurality of discrete fabric tiles comprise leather.

12. The multi-layer textile of claim 1, wherein the plurality of discrete fabric tiles comprise canvas.

13. A multi-layer textile comprising:
   a base textile layer having a first side and a second side;
   a bonding layer coupled directly with the first side of the base textile layer;
   a tiled fabric layer having a plurality of discrete fabric tiles, wherein each of the plurality of discrete fabric tiles has a first two-dimensional shape,
      wherein the bonding layer includes a plurality of discrete bonding tiles layered directly between each of the plurality of discrete fabric tiles and the base textile layer;

wherein each of the plurality of discrete bonding tiles includes a peripheral edge, such that the peripheral edge of each of the plurality of discrete bonding tiles abuts the peripheral edge of an adjacent discrete bonding tile.

14. The multi-layer textile of claim 13, wherein the first and second fabric tiles each includes a bonded surface facing towards the base textile layer, an exposed surface facing away from the bonded surface, and a thickness between the bonded surface and the exposed surface;
wherein the tiled fabric layer includes a fabric-layer thickness comprising an average thickness of the first and second fabric tiles.

15. The multi-layer textile of claim 13, wherein the first perimeter edge of the first fabric tile and the second perimeter edge of the second fabric tile are in direct contact with each other.

16. The multi-layer textile of claim 13,
wherein the first fabric tile includes a first bonded surface facing towards the bonding layer and having a first two-dimensional shape;
wherein the bonding layer includes a first discrete bonding-layer portion layered between the first fabric tile and the base textile layer and having a second two-dimensional shape, which is a same shape as the first two-dimensional shape;
wherein the second fabric tile includes a second bonded surface facing towards the bonding layer and having a third two-dimensional shape; and
wherein the bonding layer includes a second discrete bonding-layer portion layered between the second fabric tile and the base textile layer and having a fourth two-dimensional shape, which is a same shape as the third two-dimensional shape.

\* \* \* \* \*

UNITED STATES PATENT AND TRADEMARK OFFICE
CERTIFICATE OF CORRECTION

| | | |
|---|---|---|
| PATENT NO. | : 11,974,633 B2 | Page 1 of 1 |
| APPLICATION NO. | : 17/065370 | |
| DATED | : May 7, 2024 | |
| INVENTOR(S) | : Le Nguyen, Viet Tran and Jen Chung Wu | |

It is certified that error appears in the above-identified patent and that said Letters Patent is hereby corrected as shown below:

On the Title Page

At item (2) FOREIGN PATENTS DOCUMENTS, change:
"(2) IN 107164581 A 9/2017"
To:
-- (2) CN 107164581 A 9/2017 --.

Signed and Sealed this
Twenty-fourth Day of September, 2024

Katherine Kelly Vidal
*Director of the United States Patent and Trademark Office*